(12) United States Patent
Becker et al.

(10) Patent No.: US 7,178,154 B2
(45) Date of Patent: Feb. 13, 2007

(54) DISC DRIVE WITH CARRIER COMPLETELY IN THE DRIVE IN A LOADING POSITION AND PROTRUDING OUT OF THE DRIVE IN AN EJECT POSITION

(75) Inventors: Volker Becker, Hildesheim (DE); Lothar Vogt, Barienrode (DE)

(73) Assignee: Robert Bosch GmbH, Stuttgart (DE)

( * ) Notice: Subject to any disclaimer, the term of this patent is extended or adjusted under 35 U.S.C. 154(b) by 218 days.

(21) Appl. No.: 10/487,140

(22) PCT Filed: Aug. 16, 2002

(86) PCT No.: PCT/DE02/02994

§ 371 (c)(1),
(2), (4) Date: Sep. 2, 2004

(87) PCT Pub. No.: WO03/019551

PCT Pub. Date: Mar. 6, 2003

(65) Prior Publication Data

US 2005/0010935 A1    Jan. 13, 2005

(30) Foreign Application Priority Data

Aug. 22, 2001   (DE) ............................... 101 41 079

(51) Int. Cl.
*G11B 17/04*   (2006.01)
*G11B 19/10*   (2006.01)
*G11B 25/04*   (2006.01)

(52) U.S. Cl. ............... 720/601; 720/606; 720/636; 720/653

(58) Field of Classification Search .......... 720/601–616, 720/642, 627, 636, 628, 653

See application file for complete search history.

(56) References Cited

U.S. PATENT DOCUMENTS

| 4,580,256 A | 4/1986 | Inaba et al. |
| 5,054,016 A | 10/1991 | D'Alayer et al. |
| 5,974,016 A | 10/1999 | Andrews et al. |
| 6,028,831 A | 2/2000 | Scholz et al. |

FOREIGN PATENT DOCUMENTS

| DE | 35 15 437 A1 | 11/1985 |
| DE | 195 48 541 A1 | 6/1997 |
| EP | 0 935 245 A1 | 8/1999 |

*Primary Examiner*—Craig A. Renner
(74) *Attorney, Agent, or Firm*—Kenyon & Kenyon LLP

(57) ABSTRACT

A drive for storage disc which permits a convenient means of loading and unloading the storage disc. The drive includes a loading device for transport of a storage disc into the drive, the loading device including a carrier for accommodating the storage disc. In a loading position, the carrier remains generally in the drive and, in the direction of an insertion opening of the drive, includes an opening for insertion of the storage disc.

19 Claims, 3 Drawing Sheets

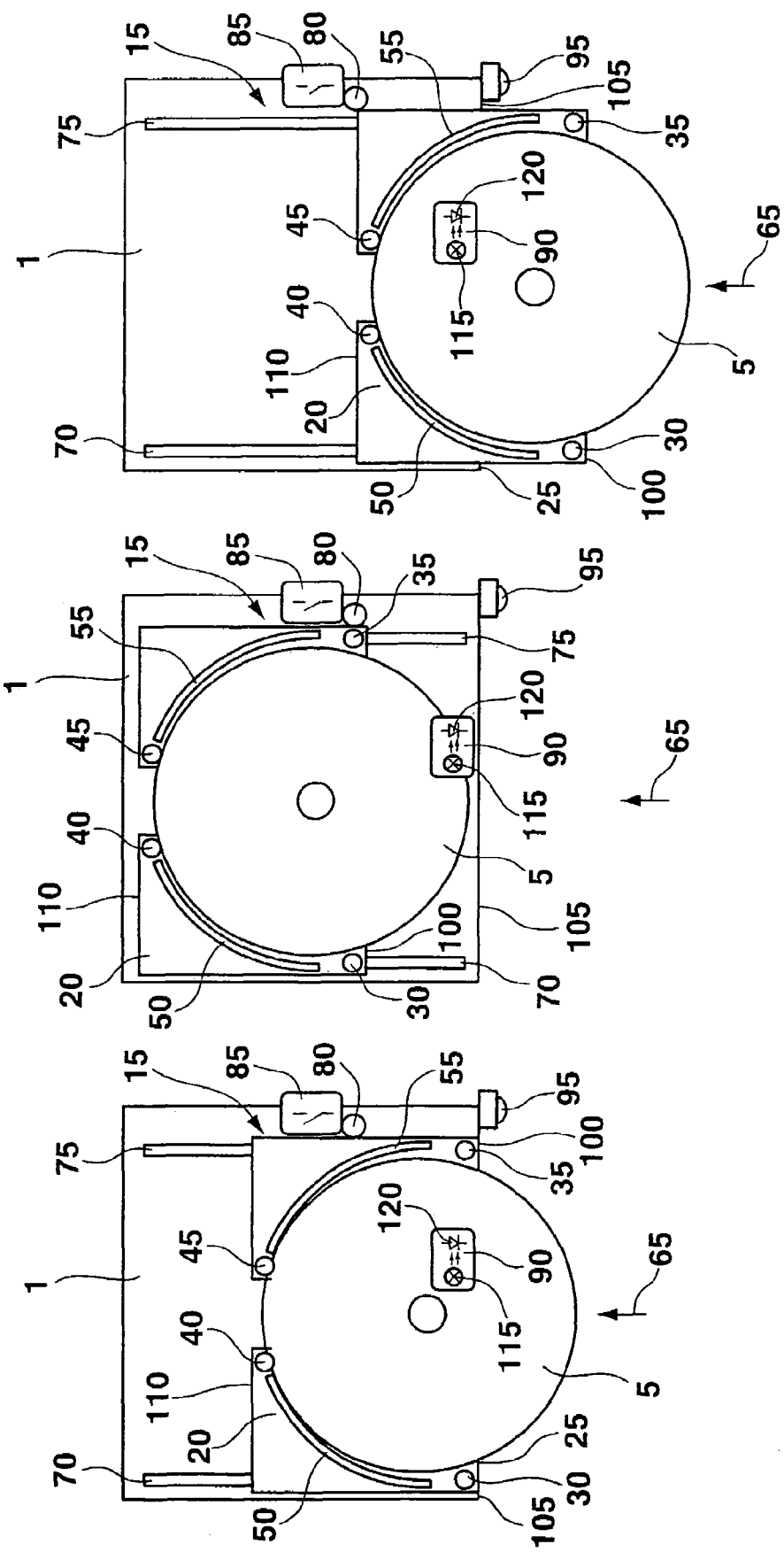

DISC DRIVE WITH CARRIER COMPLETELY IN THE DRIVE IN A LOADING POSITION AND PROTRUDING OUT OF THE DRIVE IN AN EJECT POSITION

FIELD OF THE INVENTION

The present invention is directed to a drive.

BACKGROUND INFORMATION

Conventional drives for storage discs have a loading device for transport of a storage disc into the drive, the loading device including a carrier to accommodate the storage disc. The carrier is typically designed as a tray which moves out of the drive for loading the storage disc.

SUMMARY

A drive according to an example embodiment of the present invention may have the advantage that the carrier remains generally in the drive in a loading position. This makes it possible to implement a carrier in the form of a tray which need not be ejected from the drive to load the storage disc. Instead, the storage disc may be inserted directly into the drive as is the case with a roller feeder without the possibility of soiling or damaging the storage disc as is the case with a roller feeder. Direct insertion eliminates additional operating procedures for the user for loading the storage disc, such as pressing of buttons, so the drive according to the present invention may be used to particular advantage in an automobile in which the user, who is also the driver of the vehicle, should be distracted as little as possible from traffic on the road.

A loading device of the drive according to an example embodiment of the present invention is also less susceptible to small parts being inserted into it. Due to its comparatively uncomplicated design, wear on the loading device of the drive according to the present invention and on the storage discs transported by this loading device is greatly reduced.

It is particularly advantageous if the carrier in the area of the opening includes two elastically mounted centering elements, the distance between them being less than the diameter of a first storage disc, insertion of the first storage disc through the insertion opening and the opening onto the carrier forcing the centering elements apart, and the carrier including at least one holding element on a side facing away from the opening for blocking a first storage disc inserted. In this way, the storage disc is securely gripped by the centering elements and deposited on the carrier in a defined position. Thus, the storage disc may be brought exactly to the playback position by the carrier. Loading errors are prevented in this way.

It may be particularly advantageous if the carrier includes an edge which forms an arc-shaped border between each of the two centering elements and the at least one holding element. In this way, storage discs designed as shaped (e.g., non-circular) compact discs may be centered on the carrier and brought with the carrier into a defined playback position. By definition, at least three points on the contour of these shaped compact discs lie on a circle which corresponds to the outer edge of the usual compact discs, so that the shaped compact discs are positioned and centered on the carrier at least by these three points via the circular connections.

It may also be particularly advantageous if the carrier includes a recess which forms a receptacle for depositing a second storage disc having a smaller diameter than the first storage disc. In this way, storage discs having a smaller diameter than that provided for conventional compact discs may also be held in a centered position on the carrier and in this way brought into a defined playback position by the carrier.

The recess makes it possible to position such smaller storage discs on the carrier in a form-fitting manner.

It may also be advantageous if the dimension of the carrier in the direction of insertion amounts to approximately two-thirds of the diameter of the first storage disc. Therefore, the user need not insert the first storage disc completely into the drive, but instead the disc is already gripped completely by the carrier when the first storage disc is still projecting out of the drive by one-third of its diameter.

It may also be advantageous if the drive mechanism is situated at a distance amounting to approximately half of the dimension of the carrier in the direction of insertion, starting from the loading position of the carrier, away from the insertion opening and engages with the carrier. This makes it possible for the carrier to be moved both into the playback position and into the eject position with the least possible design complexity.

It may be particularly advantageous if the loading device includes at least one sensor, which detects a storage disc placed on the carrier. This makes it possible to implement automatic loading of the storage disc via the carrier into the playback position, which does not require any additional activity on the part of the user and is thus particularly convenient for the user.

A particularly simple implementation of such a sensor which makes use of the available drive mechanism involves a first sensor designed as a pressure sensor, the first sensor being connected to the drive mechanism and detecting when a force is exerted on the carrier and thus on the drive mechanism in the direction of insertion.

It may also be particularly advantageous if the loading device includes a loading switch and that when the loading switch is operated, the loading device brings the carrier from the loading position into an eject position in which the carrier protrudes out of the insertion opening. This also makes is possible to place storage discs having a smaller diameter than usual on the carrier and thereby transport them via the carrier into the playback position.

It may also be advantageous if, in the eject position, the carrier protrudes approximately halfway out of the insertion opening. This allows the storage disc to be moved out of the drive to a particularly great extent, allowing convenient removal of the storage disc on the part of the user.

It may also be advantageous if the loading device brings the carrier from the eject position into the loading position when the at least one sensor detects removal of a storage disc previously placed on the carrier. This permits automatic retraction of the carrier into the drive without requiring any additional action on the part of the user and is therefore particularly convenient for the user to operate.

This advantage may also be obtained when the loading device brings the carrier from the eject position into the playback position after a predetermined period of time has elapsed.

It may also be advantageous if, when the load switch is operated, the loading device brings the carrier from the eject position into the playback position. Therefore, storage discs having a smaller diameter than usual may be transported by the carrier into the playback position even if they cannot be detected by the at least one sensor as having been placed on the carrier, in particular when they have been placed on the carrier in the eject position without pressure being exerted on the drive mechanism in the insertion direction or the storage disc being recognized by an optical sensor in the drive or on the carrier because of its small size.

BRIEF DESCRIPTION OF THE DRAWINGS

An exemplary embodiment of the present invention is illustrated in the figures and explained in greater detail in the following description.

FIG. 1 shows a drive according to an example embodiment of the present invention having a carrier for accommodating a storage disc in a loading position.

FIG. 2 shows an example drive according to the present invention having the carrier in a playback position.

FIG. 3 shows an example drive according to the present invention having the carrier in an eject position.

DETAILED DESCRIPTION OF EXAMPLE EMBODIMENTS

Figure 5:
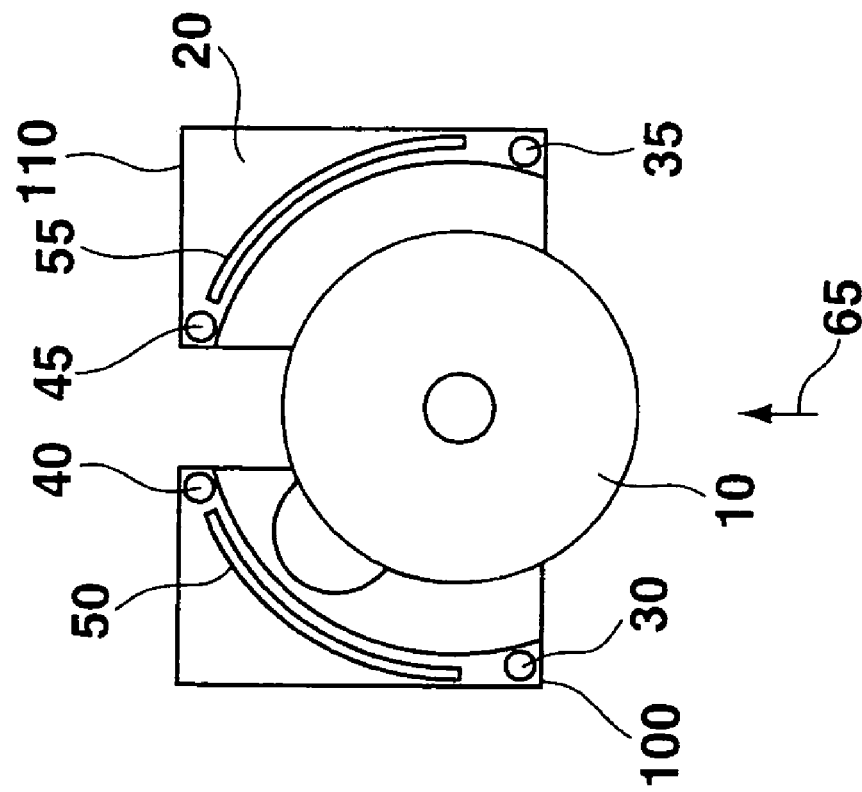
FIG. 5 shows a carrier having a storage disc of a smaller diameter than usual inserted into it.

FIG. 1 shows an example drive 1 for storage discs 5, 10, 135. Drive 1 may be, for example, a compact disc player, a compact disc changer, a minidisc player, a DVD player (digital versatile disc), a CD-ROM drive or the like. Drive 1 includes a loading device 15 for transport of a storage disc 5, 10, 135 into or out of drive 1. Loading device 15 in turn includes a carrier 20 to accommodate storage disc 5, 10, 135.

It shall be assumed below, as an example, that drive 1 is a compact disc player. According to FIG. 1, loading device 15 includes a first guide rail 70 and a second guide rail 75 which run as a linear guide in the direction of insertion 65 in drive 1, for example, and in which carrier 20 is guided. It is of course also possible to provide only one single guide rail or more than two guide rails for this purpose in drive 1. Transport of carrier 20 in guide rails 70, 75 is accomplished via a drive mechanism 80, which may be designed as a linear drive mechanism, for example. Suitable examples of a linear drive mechanism include a spindle drive, a belt drive, a toothed rod drive, a toothed belt drive, or the like.

FIG. 1 shows carrier 20 in a loading position. Carrier 20 in the loading position generally does not protrude out of an insertion opening 25 of drive 1 but instead sits completely within drive 1. As shown in FIG. 1, a front edge 100 of carrier 20 may be flush with a front edge 105 of drive 1 having insertion opening 25. In the direction of insertion opening 25, carrier 20 includes an opening for inserting storage disc 5, 10, 135.

Carrier 20, which is described here as an example, is designed like a drawer. However, it may also include only one right and one left hoop or hook between which storage disc 5, 10, 135 is clamped, which is thus simpler and uses less material. The hoops or hooks are driven in synchronization via the linear drive, for example, or are displaced individually or jointly by some other means with which those skilled in the art are familiar. The hoops or hooks likewise form an opening in the direction of insertion opening 25 for insertion of storage disc 5, 10, 135. The concept of placement of storage disc 5, 10, 135 on carrier 20 is to be differentiated explicitly from the concept of a roller feeder.

In addition, according to FIG. 1, two centering elements 30, 35 may be situated at front edge 100 in the area of the opening of carrier 20 and may be accessible via insertion opening 25 and the carrier. The distance between two centering elements 30, 35 is less than the diameter of a first storage disc 5, which in this example is a conventional compact disc. Centering elements 30, 35 are elastically supported on carrier 20. On a rear edge 110 of carrier 20 opposite front edge 100 of carrier 20, a first holding element 40 and a second holding element 45 are situated as depicted in FIG. 1. It is also possible for just a single holding element or more than two holding elements to be provided on rear edge 110 of carrier 20.

When first storage disc 5 is inserted into drive 1 through insertion opening 25 and when carrier 20 is in the loading position according to FIG. 1, first storage disc 5 at first pushes centering elements 30, 35 apart and in this way reaches a defined position on carrier 20. The insertion process is concluded when first storage disc 5 comes to rest against first holding element 40 and/or second holding element 45.

Centering elements 30, 35 and holding elements 40, 45 ensure that first storage disc 5 comes to lie in a defined position on carrier 20 and thus may also be brought into a defined playback position to prevent centering errors in securing, i.e., positioning, first storage disc 5.

Positioning of first storage disc 5 on carrier 20 may be further improved by providing a first arc-shaped border 50 on carrier 20 between first centering element 30 and first holding element 40. Similarly, a second arc-shaped border 55 may be provided between second centering element 35 and second holding element 45 on carrier 20. The radius of arc-shaped borders 50, 55 corresponds approximately to the radius of first storage disc 5.

Figure 6:
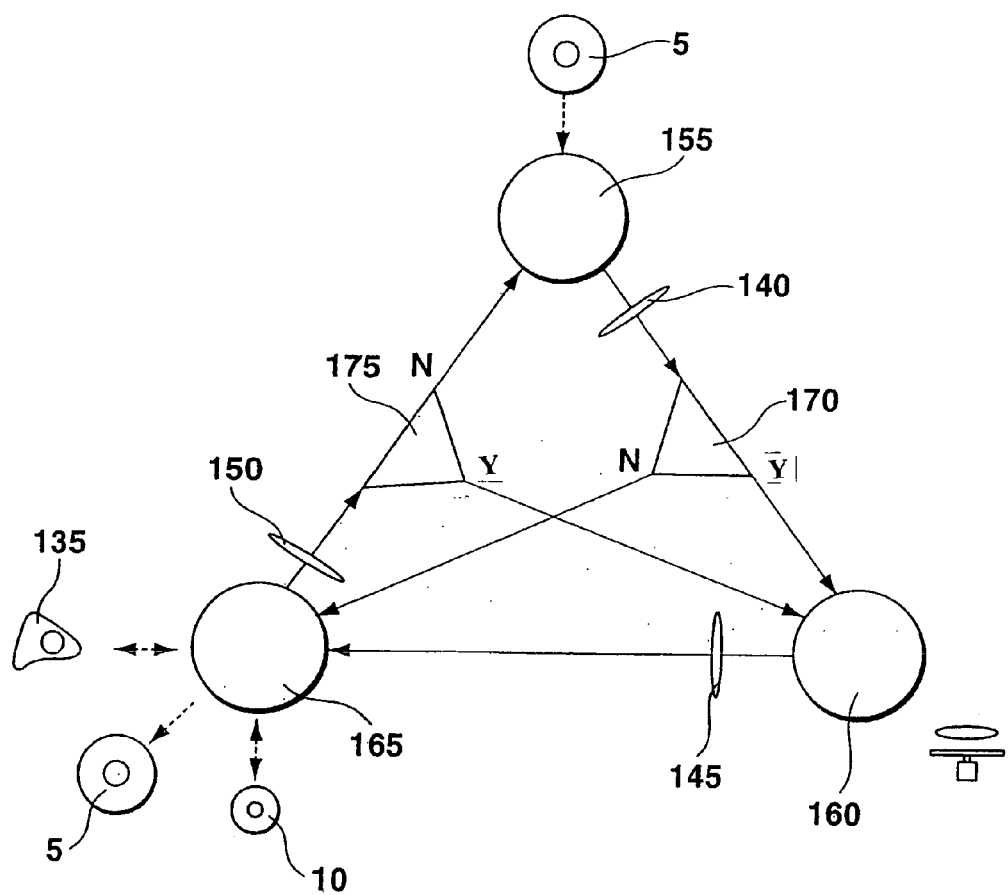
FIG. 6 shows a state transition diagram for the functioning of the example drive according to the present invention.

Arc-shaped borders 50, 55 are advantageous in particular when, instead of first storage disc 5, a shaped compact disc 135 as shown in FIG. 6 is to be inserted into drive 1 through insertion opening 25. Such a shaped compact disc 135 has the property that at least three points on its contour by definition lie on a circle, the radius of which corresponds to the radius of first storage disc 5. Thus, if centering elements 30, 35 are not gripped or pressed apart on insertion of such a shaped compact disc 135, then shaped compact disc 135 may be placed in a defined position on carrier 20 and brought into a defined playback position by it by having at least a portion of the defined points on the contour of shape compact disc 135 come to rest against arc-shaped borders 50, 55.

It is now possible according to FIG. 1 for the dimension of carrier 20 in insertion direction 65 to be smaller than the diameter of first storage disc 5. The dimension of carrier 20 in insertion direction 65 may amount to approximately two-thirds of the diameter of first storage disc 5, for example, as indicated in FIG. 1. This means that after insertion of first storage disc 5 into carrier 20 until it comes to rest against holding elements 40, 45, first storage disc 5 still protrudes out of insertion opening 25 by approximately one-third of its diameter, so that the user need not push first storage disc 5 too far into drive 1 for first storage disc 5 to be brought into the playback position. This is particularly convenient for the user, in particular when drive 1 is to be used in a motor vehicle and the user should be distracted from road traffic as little as possible. The distance between centering elements 30, 35 and holding elements 40, 45 may be selected in such a way that after complete insertion of first storage disc 5 into carrier 20, i.e., after first storage disc 5 comes to rest against holding elements 40, 45, centering elements 30, 35 return to their starting position.

As shown in FIG. 1, it is also possible for drive mechanism 80 to be situated in drive 1 at a distance from insertion opening 25 and to be engaged with carrier 20, this distance amounting to approximately half of the dimension of carrier 20 in the direction of insertion 65, based on the loading position of carrier 20. Carrier 20 may thus always be in direct engagement with drive mechanism 80, both when it is being moved into the playback position in drive 1 as well as when it is being moved out of drive 1 into the eject position. This is depicted in FIG. 2 for the playback position and in FIG. 3 for the eject position.

According to FIG. 1, it is now possible to provide for loading device 15 to include at least one sensor 85, 90, which detects whether a storage disc has been placed on carrier 20. A first sensor 85 which is designed as a pressure sensor may be provided; it is connected to drive mechanism 80 in such a way that it detects when a force is exerted on carrier 20 in insertion direction 65 and thus on drive mechanism 80. This is interpreted as indicating that a storage disc has been inserted through insertion opening 25 into carrier 20.

A regular switch is also possible as the pressure sensor. Such a switch is actuated in the eject position by carrier 20, which is in the eject position. If carrier 20 is pushed slightly into drive 1, the switch is released and the pressure is detected.

In addition or as an alternative, a second sensor 90 may also be provided, this sensor being designed as an optical sensor, for example, which also detects whether a storage disc has been inserted into carrier 20 through insertion opening 25. Optical sensor 90 may include a light source 115 and a photodiode 120. Light source 115 and photodiode 120 are situated on carrier 20 in such a way that when the storage disc is not inserted into carrier 20, the light emitted by light source 115 is received by photodiode 120, and when the storage disc is inserted into carrier 20, the beam of light from light source 115 to photodiode 120 is interrupted, so the presence of the storage disc in carrier 20 is detected in this way.

In addition, loading device 15 may optionally include a loading switch 95, in which case after actuation of loading switch 95, loading device 15 moves carrier 20 from the loading position into the eject position in which carrier 20 protrudes out of insertion opening 25. Loading switch 95 thus triggers drive mechanism 80.

In FIG. 2, the same reference numbers denote the same elements as in FIG. 1. FIG. 2 shows carrier 20 with first storage disc 5 completely inserted into carrier 20 in the playback position in which first storage disc 5 may be read by a reading head of a reading device (not shown in FIG. 2). From the loading position, carrier 20 is moved into the playback position via drive mechanism 80 along guide rails 70, 75. When, as in the example shown in FIG. 1 and described here, the dimension of carrier 20 in insertion direction 65 amounts to approximately two-thirds of the diameter of first storage disc 5, then first storage disc 5 is situated completely in drive 1 when it is inserted into carrier 20 until it comes to rest on holding elements 40, 45 and is moved by carrier 20 a distance into drive 1, which corresponds approximately to one-third of the diameter of first storage disc 5. When drive mechanism 80 is positioned in drive 1, as described in conjunction with FIG. 1, it then engages in the area of front edge 100 in carrier 20 in the playback position according to FIG. 2 in such a way that transport of carrier 20 back out of the playback position and into the loading position or into the eject position by drive mechanism 80 is ensured.

In FIG. 3, the same reference numbers are again used to denote the same elements as in the figures described previously. As shown in FIG. 3, carrier 20 having first storage disc 5 completely inserted is in the eject position and protrudes out of insertion opening 25 and thus out of drive 1. When first storage disc 5 is inserted into carrier 20 as far as the stop on holding elements 40, 50 and the dimension of carrier 20 in insertion direction 65 amounts to approximately two-thirds of the diameter of first storage disc 5, then first storage disc 5 protrudes out of drive 1, i.e., out of insertion opening 25 by approximately two-thirds of its diameter when carrier 20 has been moved by drive mechanism 80 approximately halfway out of drive 1 through insertion opening 25 along guide rails 70, 75. This permits convenient removal of first storage disc 5 from drive 1 by the user. When drive mechanism 80 is positioned in drive 1, as described in conjunction with FIG. 1, it still engages in carrier 20 in the area of rear edge 110 of carrier 20 when carrier 20 is in the eject position described above according to FIG. 3 and thus ensures that carrier 20 will be transported back into drive 1.

Figure 4:
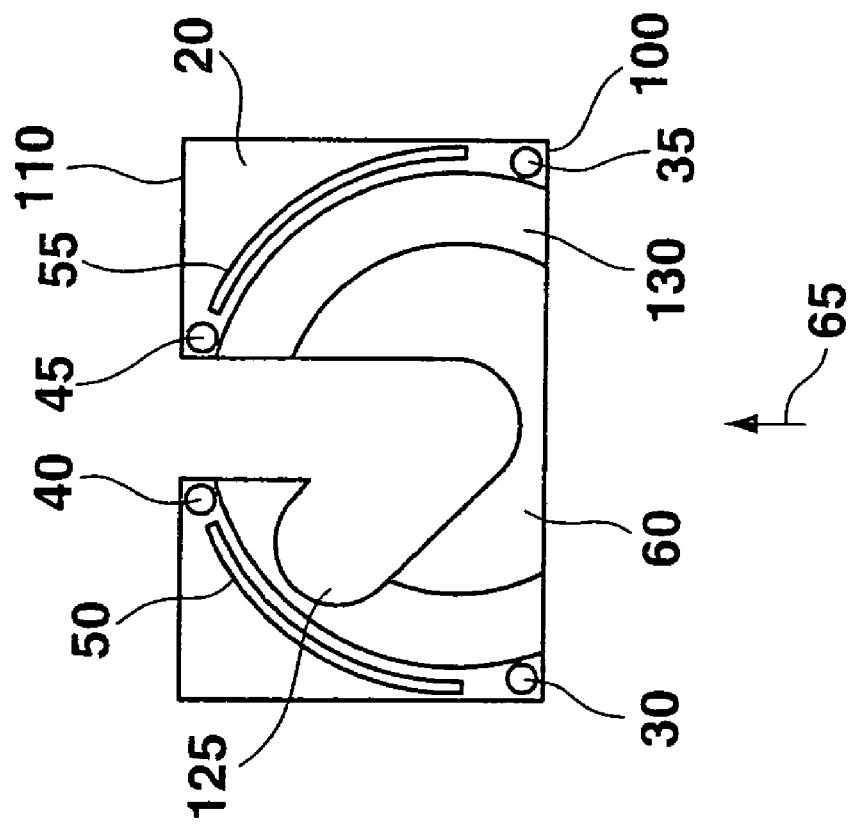
FIG. 4 shows a carrier.

FIG. 4 shows carrier 20 in greater detail, including a recess 125 in the receptacle area for storage discs 5, 10, 135. When carrier 20 has been brought into the playback position, as shown in FIG. 2, a turntable is in the area of recess 125. When carrier 20 is lowered for playback of storage disc 5, 10, 135 that has been inserted, inserted storage disc 5, 10, 135 is engaged with the turntable (not shown in FIG. 4) and may be rotated by it to permit readout by the reading device of drive 1, which is also not shown in the figures. As an alternative, the turntable may also be raised to grip storage disc 5, 10, 135 and cause it to rotate.

As shown in FIG. 4, a recess 60 having an arc-shaped perimeter for first storage disc 5 may be optionally provided in such a way that it is concentric with a supporting surface 130, this supporting surface being delineated in a defined manner by centering elements 30, 35, holding elements 40, 45 and optionally arc-shaped borders 50, 55; the diameter of this recess is smaller than the diameter of first storage disc 5 and is used to accommodate a second storage disc 10 having a smaller diameter than first storage disc 5, as depicted in FIG. 5, where the same reference numbers denote the same elements as in FIG. 4. In FIG. 4 the same reference numbers also denote the same elements as in the other figures.

In a state transition diagram according to FIG. 6, the functioning of drive 1 according to the example embodiment of the present invention is explained in greater detail. In a first state 155 of drive 1, carrier 20 is in the loading position according to FIG. 1. It is possible to depart from first state 155, i.e., the loading position of carrier 20, when a first condition 140 has been met. First condition 140 is met when at least one of the following cases occurs:

1. First sensor 85 detects that a storage disc 5, 10, 135 has been inserted through insertion opening 25 into carrier 20.
2. Second sensor 90 detects that a storage disc 5, 10, 135 has been inserted into carrier 20 through insertion opening 25.
3. Loading switch 95 is actuated.

If carrier 20 is in the loading position, storage discs having the diameter of first storage disc 5, i.e., storage discs having a traditional diameter, e.g., traditional compact discs, are usually inserted into carrier 20 through insertion opening 25.

If the first condition 140 is met, a check is performed to determine whether fourth condition 170 is met. Fourth condition 170 is met when a storage disc 5, 10, 135 has been inserted in the loading position of carrier 20. Fourth condition 170 is met in the two cases mentioned first of detection by first sensor 85 or second sensor 90. However, if neither first sensor 85 nor second sensor 90 detects a storage disc in carrier 20 on actuation of loading switch 95, then the fourth condition 170 is not met. If fourth condition 170 is met, there is a state transition to a second state 160 in which carrier 20 is in the playback position. This state transition is characterized in that carrier 20 is transported from the loading position into the playback position according to FIG. 2. If fourth condition 170 is not met, there is a state transition to a third state 165 in which carrier 20 is in the eject position according to FIG. 3 so that in this state transition carrier 20 is transported from the loading position into the eject position. In second state 160, inserted storage disc 5, 10, 135 is played back, i.e., the data stored on it is read out by a reading device of drive 1 and sent for playback. A transition from second state 160 occurs when second condition 145 is met. Second condition 145 is met when at least one of the two following cases occurs:

4. Loading switch 95 is actuated.
5. A readout error in playback of the storage disc is detected by a logic unit for analysis of the readout data (not shown in the figures).

If second condition 145 is met, there is a state transition from second state 160 to third state 165, i.e., carrier 20 is transported from the playback position into the eject position according to FIG. 3. A transition from third state 165, i.e., the eject position of carrier 20, occurs when a third condition 150 is met. Third condition 150 is met when at least one of the following four cases occurs:

6. Loading switch 95 is actuated.
7. First sensor 85 detects that a storage disc 5, 10, 135 has been placed in carrier 20.
8. Second sensor 90 detects that a storage disc 5, 10, 135 has been placed in carrier 20.
9. A predetermined time has elapsed after reaching third state 165.

When third condition 150 is met, a check is performed to determine whether a sixth condition 175 is met. Sixth condition 175 is met when a storage disc 5, 10, 135 has been inserted in third state 165, i.e., for example when the seventh or eighth case occurs and one of two sensors 85, 90 has detected that a storage disc 5, 10, 135 has been inserted. If sixth condition 175 is met, a state transition to second state 160 occurs and carrier 20 is transported from the eject position into the playback position for playback of inserted storage disc 5, 10, 135. If neither of the two sensors 85, 90 detects a storage disc 5, 10, 135 in carrier 20 in the sixth or ninth case, then sixth condition 175 is not met and there is a state transition from third state 165 to first state 155 in which carrier 20 is transported from the eject position into the loading position.

In third state 165, i.e., when carrier 20 is in the eject position, a storage disc 5, 10, 135 placed in carrier 20 may be removed from carrier 20 or a storage disc 5, 10, 135 may be placed in carrier 20. For loading a traditional storage disc having the diameter of first storage disc 5, first state 155 of drive 1, i.e., the loading position of carrier 20, is provided according to the present invention, so that loading of such a storage disc in third state 165 is possible but is not necessary. In other words, for loading first storage disc 5, carrier 20 need not first be brought into the eject position. Instead, the eject position of carrier 20 is used mainly for convenient removal of first storage disc 5 from carrier 20. For second storage disc 10 and shape compact discs, which are labeled with reference number 35 in FIG. 6, however, it is advisable to provide the eject position of carrier 20, i.e., third state 165 for loading such storage discs because otherwise a defined central insertion of such a storage disc in the loading position of carrier 20 is not ensured. The eject positions of carrier 20 and thus third state 165 also have the function of removal of second storage disc 10 and/or shape compact disc 135 from carrier 20.

If in third state 165 the user has removed an inserted storage disc 5, 10, 135, this removal is detected by the fact that neither first sensor 85 nor second sensor 90 detects an inserted storage disc, i.e., no pressure is exerted on pressure sensor 85 and the light beam of optical sensor 90 is not interrupted. In this way, sensors 85, 90 detect that storage disc 5, 10, 135 has been removed because they no longer detect an inserted storage disc. As described above, this results in the transition to first state 155. If at least one of the two sensors 85, 90 detects an inserted memory 5, 10, 135 due to exertion of pressure on drive mechanism 80 and thus on pressure sensor 85 and/or due to interruption of the beam of light of optical sensor 90 on actuation of loading switch 95 or when a predetermined period of time has elapsed according to the sixth or ninth case in third state 165, then there is a transition of state from third state 165 to second state 160, as described above. However, if an inserted storage disc 5, 10, 135 is not detected by either of the two sensors 85, 90 when the sixth or ninth case occurs, then there is a transition of state from third state 165 to first state 155 as described above. Thus, on insertion of a storage disc 5, 10, 135 in third state 165, carrier 20 is brought into the playback position immediately after detection of inserted storage disc 5, 10, 135 by at least one of two sensors 85, 90, or, at the latest, on actuation of loading switch 95 or after the predetermined period of time has elapsed, if an inserted storage disc 5, 10, 135 is then detected by at least one of the two sensors.

Optical sensor 90 is advantageously situated in drive 1, namely in the area of front edge 105 of drive 1. This ensures detection of storage discs 5, 10, 135 inserted into carrier 20 in both the loading position and in the eject position and, as can be seen in FIG. 2, also in the playback position of carrier 20. To be able to detect the insertion of storage discs having a smaller diameter such as second storage disc 10 or shape compact discs or shape storage discs 135 in general in both the loading position and in the eject position of carrier 20, it is advantageous for optical sensor 90 to also be situated at approximately the same distance from each of the two centering elements 30, 35.

For implementation of the state transitions according to FIG. 6 and for calling up the conditions of the state transition diagram shown there, drive 1 includes a control unit (not shown in the figures) to which sensors 85, 90, drive mechanism 80, and loading switch 95 are connected.

According to the example embodiment of the present invention, it is possible for carrier 20 to protrude out of drive 1 only in the eject position.

What is claimed is:
1. A drive, comprising:
   a loading device configured to transport a storage disc into the drive, the loading device including a carrier which is configured to accommodate the storage disc, wherein the carrier remains completely in the drive when in a loading position, and the carrier protrudes out of the drive when in an eject position.

2. The drive as recited in claim 1, wherein the carrier forms a first opening for insertion of the storage disc in a direction of an insertion opening of the drive.

3. The drive as recited in claim 2, wherein the carrier includes two elastically mounted centering elements in an area of the first opening, a distance between the centering elements less than a diameter of a first storage disc, insertion of the storage disc through the insertion opening and the first opening onto the carrier forcing the centering elements apart, and wherein the carrier includes at least one holding element on a side facing away from the first opening for blocking an inserted storage disc.

4. The drive as recited in claim 3, wherein a distance between the centering elements and the at least one holding element is such that when the first storage disc strikes against the at least one holding element, the centering elements return to their starting positions.

5. The drive as recited in claim 3, wherein the carrier has an edge which forms an arc-shaped border between each of the two centering elements and the at least one holding element.

6. The drive as recited in claim 3, wherein the carrier includes a recess which forms a receptacle for depositing a second storage disc having a smaller diameter than the first storage disc.

7. The drive as recited in claim 1, wherein an extension of the carrier, in a direction of insertion, is approximately two-thirds of the diameter of the storage disc.

8. The drive as recited in claim 1, wherein the loading device includes a linear guide in which the carrier is mounted.

9. The drive as recited in claim 3, wherein the loading device includes a linear drive mechanism for transport of the carrier.

10. The drive as recited in claim 9, wherein the drive mechanism is situated at a distance of approximately half of an extension of the carrier, in an insertion direction, based on a loading position of the carrier, from the insertion opening and engages with the carrier.

11. The drive as recited in claim 1, wherein the loading device includes at least one sensor which detects a storage disc placed on the carrier.

12. The drive as recited in claim 1, wherein the loading device includes a linear drive mechanism for transport of the carrier, and at least one sensor which detects a storage disc placed in the carrier, and wherein a first one of the at least one sensor is a pressure sensor, is connected to the drive mechanism and detects when a force is exerted on the carrier and thus on the drive mechanism in an insertion direction.

13. The drive as recited in claim 12, wherein a second one of the at least one sensor is an optical sensor.

14. The drive as recited in claim 11, wherein the loading device is configured to bring the carrier into a playback position when the at least one sensor detects a storage disc placed on the carrier.

15. The drive as recited in claim 2, wherein the loading device includes a loading switch, the loading device configured to bring the carrier from the loading position into the eject position in which the carrier protrudes out of the insertion opening after actuation of the loading switch.

16. The drive as recited in claim 2, wherein the carrier protrudes approximately halfway out of the insertion opening in the eject position.

17. The drive as recited in claim 2, wherein the loading device is configured to bring the carrier from the eject position into a loading position when removal of a storage disc previously placed on the carrier is detected.

18. The drive as recited in claim 2, wherein the loading device is configured to bring the carrier from the eject position into a playback position after a predetermined period of time has elapsed.

19. The drive as recited in claim 15, wherein on actuation of the loading switch, the loading device is configured to bring the carrier from the eject position into a playback position.

* * * * *